United States Patent
Zimmermann et al.

[11] Patent Number: 5,279,484
[45] Date of Patent: Jan. 18, 1994

[54] MANNED SPACE VEHICLE WITH LOW-LEVEL HYDROGEN-OXYGEN-CARBON DIOXIDE PROPULSION UNIT

[75] Inventors: Frank S. Zimmermann, Vienna, Va.; Victor A. Moseley, Los Altos, Calif.

[73] Assignee: Loral Aerospace Corporation, New York, N.Y.

[21] Appl. No.: 849,485

[22] Filed: Mar. 11, 1992

[51] Int. Cl.$^5$ .......................... B64G 1/40; B64G 1/48
[52] U.S. Cl. .................................. 244/172; 244/163; 244/162
[58] Field of Search .............. 244/169, 172, 164, 59, 244/163, 118.5, 162, 163, 158 R; 60/39.12, 39.465; 454/76

[56] References Cited

U.S. PATENT DOCUMENTS

| | | | |
|---|---|---|---|
| 3,286,954 | 11/1966 | Swet | 244/163 |
| 3,430,602 | 3/1969 | Greiner | 440/5 |
| 3,490,235 | 1/1970 | Grant | 60/39.12 |
| 3,773,574 | 11/1973 | Bridgforth, Jr. et al. | 149/22 |
| 3,982,878 | 9/1976 | Yamane et al. | 60/39.26 |
| 4,345,729 | 8/1982 | Barter | 244/169 |
| 4,698,965 | 10/1987 | Delchev et al. | 60/227 |

Primary Examiner—Michael S. Huppert
Assistant Examiner—Anne E. Bidwell
Attorney, Agent, or Firm—Perman & Green

[57] ABSTRACT

A manned space vehicle is described whose altitude control is achieved by constant drag compensation through the action of low level thrusters. The space vehicle include a low pressure electrolyzer that generates hydrogen and oxygen from water in a mass ratio of eight parts of oxygen to one part hydrogen. Oxygen and hydrogen from the electrolyzer are fed to the low level thrusters, with the oxygen proportion being reduced to limit thruster degradation. A life support system employs the excess oxygen from the electrolyzer and extracts carbon dioxide from the atmosphere of the vehicle. The extracted carbon dioxide is fed to the low level thrusters. The carbon dioxide enters into the combustion process with the oxygen and hydrogen, providing additional oxygen to the process and serving as a diluent to reduce the combustion temperature.

10 Claims, 1 Drawing Sheet

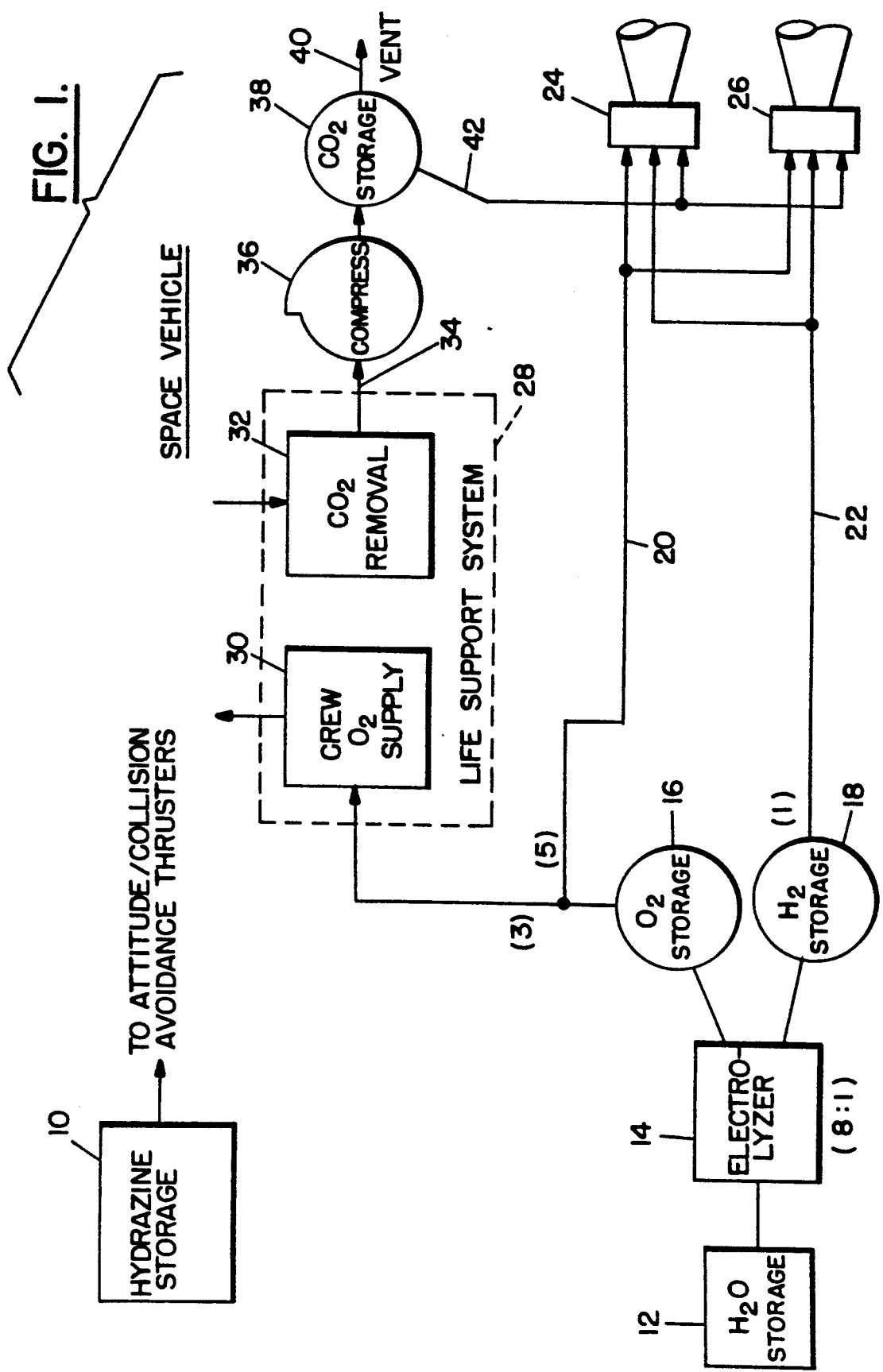

MANNED SPACE VEHICLE WITH LOW-LEVEL HYDROGEN-OXYGEN-CARBON DIOXIDE PROPULSION UNIT

The U.S. Government has license rights in this invention pursuant to funding from the National Aeronautics and Space Administration.

FIELD OF THE INVENTION

This invention relates to outer space propulsion units, and more particularly, a low-thrust propulsion unit for altitude control which employs oxygen, hydrogen and carbon dioxide as propellants.

BACKGROUND OF THE INVENTION

The propulsion system of a manned space vehicle, such as the space station, must satisfy a number of requirements. It must provide for reboost to compensate for loss of altitude due to atmospheric drag; provide a capability to perform a velocity change maneuver for collision avoidance; and act as a backup for the control gyros of the guidance and control system to provide space station attitude control. To meet those propulsion requirements, the prior art has suggested a number of different systems. A hydrogen-oxygen propulsion system has been proposed which uses a high pressure electrolyzer to generate hydrogen and oxygen propellants from on-board water. The expected specific impulse of such a system, combined with its ability to use on-board water for fuel, has made it a viable alternative. However, there are significant system development risks and safety risks associated with storing large quantities of high pressure gaseous hydrogen and oxygen on a space station. In particular, space-qualified, high pressure electrolyzers are beyond the state of the art and are also a possible safety risk.

Another propulsion system proposed to meet the above noted space station requirements employs a hydrazine monopropellant to power the thrusters. The hydrazine system's electrical power consumption, as contrasted to the hydrogen-oxygen system, is significantly less since the only power usage is for controls, and heaters to keep the hydrazine from freezing. The principal disadvantage of a hydrazine-based system is the resupply problem. Because of the large mass of resupplied hydrazine, the expense of resupply is high.

In a space station, approximately ninety percent of on-board propellant is employed for altitude maintenance. Two altitude control methods are commonly used, i.e. reboost and constant drag compensation. A reboost flight profile allows the space vehicle's orbit to decay to a certain altitude, at which point the vehicle is reboosted to a higher altitude orbit. Such reboost requires relatively high thrust and is performed at periodic intervals to maintain a minimum orbit altitude or orbit lifetime. Constant drag compensation involves continuing altitude compensation to avoid orbit decay. Such systems can employ low level thrusters which are not sufficiently powerful to be used for attitude control or collision avoidance.

Accordingly, it is an object of this invention to provide a space station with hydrogen-oxygen based low level thrusters for constant drag compensation.

It is another object of this invention to utilize carbon dioxide as an additional propellant in low level hydrogen-oxygen thrusters.

It is still another object of this invention to utilize oxygen and hydrogen from an electrolysis process for low level thrusters wherein excess oxygen is employed for crew life support and the proportion of oxygen and hydrogen fed to the thrusters is in a range to enable long thruster life.

SUMMARY OF THE INVENTION

A manned space vehicle is described whose altitude control is achieved by constant drag compensation through the action of low level thrusters. The space vehicle include a low pressure electrolyzer that generates hydrogen and oxygen from water in a mass ratio of eight parts of oxygen to one part hydrogen. Oxygen and hydrogen from the electrolyzer are fed to the low level thrusters, with the oxygen proportion being reduced to limit thruster degradation. A life support system employs the excess oxygen from the electrolyzer and extracts carbon dioxide from the atmosphere of the vehicle. The extracted carbon dioxide is fed to the low level thrusters. The carbon dioxide enters into the combustion process with the oxygen and hydrogen, providing additional oxygen to the process and serving as a diluent to reduce the combustion temperature.

DESCRIPTION OF THE DRAWINGS

FIG. 1 is a block diagram illustrating a space vehicle that incorporates the invention.

DETAILED DESCRIPTION OF THE INVENTION

As will be hereinafter understood, a space vehicle is provided with at least two separate propulsion systems, one which employs hydrazine for attitude/collision avoidance and another which employs hydrogen, oxygen and carbon dioxide as propellants for constant drag compensation. As shown in FIG. 1, a hydrazine storage tank 10 is employed to feed its fuel to attitude/collision avoidance thrusters (not shown) upon demand. The hydrazine propulsion system can be used as a backup to the to-be-described altitude control system thrusters.

Within the space vehicle, a water storage tank 12 is connected to a low pressure electrolyzer 14 which provides oxygen and hydrogen flow to oxygen storage tank 16 and hydrogen storage tank 18 respectively. Electrolyzer 14 is of the known variety which operates at less than 500 psi and produces an oxygen to hydrogen mass flow ratio of 8:1. If such a ratio of hydrogen and oxygen was fed directly to a low level thruster, the stoichiometric oxygen content would cause an excessive combustion temperature and result in short thruster life. However, by burning oxygen and hydrogen at a mass flow ratio of 5:1, respectively, thruster life is significantly extended due to the lower oxygen levels.

Feed lines 20 and 22 provide oxygen and hydrogen, respectively, to low level thrusters 24 and 26. Feed line 20 provides a mass flow of 5 times that in feed line 22, thereby assuring the desired 5:1 ratio. Those skilled in the art will realize that this ratio can be varied (e.g. 4:1, 6:1) but it is important to maintain the oxygen level at substantially less than an 8:1 ratio to the hydrogen mass flow.

Since only five of the eight parts of oxygen produced by electrolyzer 14 are fed to thrusters 24 and 26, the remaining three parts can be fed to life support system 28 and a crew oxygen supply 30 contained therein. Life support system 28 also includes a carbon dioxide scrubber 32 which removes carbon dioxide from the atmosphere of the space vehicle and provides it, via line 34, to compressor 36. The output from compressor 36 is fed to a carbon dioxide storage tank 38, where, if an over-pressure occurs, it may be vented via line 40. The remaining carbon dioxide is fed via line 42 to thrusters 24 and 26, at a flow rate to contribute approximately one third of the propellant mass flow to each of the thrusters.

Since an approximately 5:1 oxygen to hydrogen ratio flow into thrusters 24 and 26 will result in a combustion temperature of approximately 5500° F., the carbon dioxide concurrently fed to thrusters 24 and 26 will be "cracked" at that temperature to carbon monoxide and oxygen. Combustion of the thus-produced oxygen contributes to the thrust produced by thrusters 24 and 26, and at the same time eliminates a waste product from the space vehicle. The carbon dioxide thus contributes to the combustion process and, at the same time, acts as a diluent to reduce the temperature of combustion. The reduced combustion temperature permits extended thruster life.

The sizing of the propulsion system shown in FIG. 1 is dependant upon the drag acceleration imposed on the space vehicle. Such drag typically does not exceed 0.3 micro-g's. Further, the space vehicle should not drop below an altitude at which orbital decay over the subsequent 90 days results in a penetration of the minimum control altitude of 150 nautical miles. The force necessary to counteract the expected drag of 0.3 micro-g is approximately 0.18 lbf.

A low-thrust constant drag compensation thruster system can run two 0.1 lbf thrusters nearly continuously to provide the necessary drag counteracting force. Such a system, as shown in FIG. 1, uses a low pressure electrolyzer and waste carbon dioxide as propellant sources. Assuming a water mass flow input to electrolyzer 14 of 3 pounds per hour, oxygen storage tank 16 must be sized to handle approximately 4 lbm of oxygen at 100 to 400 psi, whereas hydrogen storage tank 18 must be sized to handle ½ lbm of hydrogen at 100 to 400 psi.

To assure that each of thrusters 24 and 26 produces approximately 0.14 pound seconds of thrust, an oxygen supply of 1.65 lbm per hour is fed via line 20 whereas approximately 0.33 lbm per hour of hydrogen is fed via line 22. Similarly, approximately 1 lbm/hour of carbon dioxide is fed to each of thrusters 24 and 26 to enable the proper ratios to be achieved (5-oxygen, 1-hydrogen, and 3-carbon dioxide).

The use of low-thrust carbon dioxide/hydrogen/oxygen thrusters for aerodynamic drag compensation can reduce hydrazine consumption by more than a factor of 10 (since it is not used for drag compensation). By maintaining the oxygen supply to the thrusters at a level of less than 8:1 (compared to hydrogen), degradation the thrusters is reduced. Further, the excess oxygen is available for crew supply. Also, the addition of carbon dioxide to the propellant in a mass flow ratio of approximately one third, enables elimination of a waste product from the space vehicle, while using that product to provide additional propulsion for the vehicle and reduced combustion temperatures in the thrusters.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. In a manned space vehicle whose altitude control is achieved by constant drag compensation through action of low-level thrusters, the combination comprising:
   electrolyzing means for generating hydrogen and oxygen from water in a mass ratio of approximately 8 parts of oxygen to 1 part of hydrogen;
   means for providing oxygen and hydrogen from said electrolyzing means to said thrusters at an oxygen to hydrogen ratio of less than 8:1;
   life support means for employing excess oxygen from said electrolyzing means that is not fed to said thrusters and for extracting carbon dioxide from atmosphere within said space vehicle; and
   means for feeding said extracted carbon dioxide as a propellant to said thrusters, said thrusters burning said provided oxygen and hydrogen at a temperature which causes oxygen in said carbon dioxide to contribute to thrust produced by said thrusters.

2. The manned space vehicle as recited in claim 1 wherein said electrolyzing means operates at a pressure less than 500 psi.

3. The manned space vehicle as recited in claim 1 wherein said oxygen and hydrogen is provided to said thrusters in a mass flow ratio of approximately 5:1, respectively.

4. The manned space vehicle as recited in claim 1 wherein said carbon dioxide is fed to said thrusters at a mass flow to enable said carbon dioxide to comprise approximately one third of the total mass flow of propellant to said thrusters.

5. The manned space vehicle as recited in claim 1 wherein said carbon dioxide acts as a diluent during combustion in said thrusters, to thereby reduce the combustion temperature therein.

6. A method for controlling the altitude of a vehicle by constant drag compensation through action of low-level thrusters, the method comprising the steps of:
   electrolyzing water to generate hydrogen and oxygen in a mass ratio of approximately 8 parts of oxygen to 1 part of hydrogen;
   providing said oxygen and hydrogen to said low-level thrusters at an oxygen to hydrogen ratio in the range of from approximately 4 to 1 to 6 to 1;
   employing for life support excess oxygen from said electrolyzing step that is not fed to said thrusters;
   extracting carbon dioxide from atmosphere within said space vehicle; and
   feeding said extracted carbon dioxide as a propellant to said low-level thrusters, said thrusters burning said provided oxygen and hydrogen at a temperature which causes oxygen in said carbon dioxide to contribute to thrust produced by said thrusters.

7. The method as recited in claim 6 wherein said electrolyzing step occurs at a pressure less than 500 psi.

8. The method as recited in claim 6 wherein said oxygen and hydrogen is provided to said low-level thrusters in a mass flow ratio of approximately 5:1, respectively.

9. The method as recited in claim 6 wherein said carbon dioxide is fed to said thrusters at a mass flow to enable said carbon dioxide to comprise approximately one third of the total mass flow of propellant to said thrusters.

10. The method as recited in claim 6 wherein said carbon dioxide acts as a diluent during combustion in said thrusters, to thereby reduce the combustion temperature therein.

* * * * *